Aug. 26, 1952    A. BOL    2,608,633
ELECTRICAL RESISTANCE
Filed Oct. 28, 1949
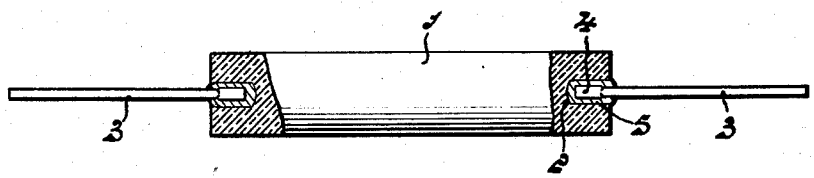
INVENTOR.
ARIE BOL
BY
AGENT Patented Aug. 26, 1952

2,608,633

UNITED STATES PATENT OFFICE 2,608,633

ELECTRICAL RESISTANCE

Arie Bol, Eindhoven, Netherlands, assignor to Hartford National Bank and Trust Company, Hartford, Conn., trustee Application October 28, 1949, Serial No. 124,009
In the Netherlands November 29, 1948

12 Claims. (Cl. 201—63)

This invention relates to methods of securing supply conductors to resistances made of sintered, semi-conductive material.

For this purpose, it is known first to apply to the area of securing the supply conductors, a metal layer, for example, by vaporisation or by firing of a metal compound dissociating upon heating and then to clamp or solder the supply conductors thereto. However, such a joint is not satisfactory from the mechanical point of view and frequently also from the electrical point of view.

It is also known to make the joint between the supply conductors and the resistance body by using sintered metal, the supply conductors being embedded therein prior to sintering or connected thereto by clamping or soldering subsequently to sintering. This method may result in a high contact resistance in the boundary layer and is complicated in that the sintering operation must be carried out in a reducing or neutral atmosphere.

According to the present invention, use is made of a mixture of silver oxide and metal powder giving an exothermic reaction upon temperature increase. The mixture is applied locally to the resistance body, preferably after being made into paste with the use of a neutral liquid, and the supply conductor is embedded in the mixture. The reaction is then initiated by transient heating to a temperature of from 400° C. to 900° C.

In order that an intermediate layer of optimum conductivity may be formed, use is preferably made in the mixture of metal which during the reaction forms a semi-conductive oxide. Such metals are, for example, iron and titanium, which are capable of forming $Fe_3O_4$ and a titanium oxide of the symbol $TiO_x$ ($x$ being approximately between 1.6 and 1.7) respectively.

It is of advantage for the mixture to consist approximately one half of silver oxide, since this leads to the formation of a contact layer having high conductivity owing to a high silver content.

It is furthermore particularly advantageous to use in the mixture a metal which is capable of forming during the reaction the same semi-conductive oxide as that contained in the resistance body. For example, with a resistance containing $Fe_3O_4$, iron is preferably chosen as the metal in the said mixture. Troublesome contact resistance is thus prevented from occurring in the boundary layer.

In order to ensure satisfactory adhesion, it is desirable for the mixture used for the joint to have the minimum shrinkage during the reaction. A decrease in volume occurs during the transformation of silver oxide into silver, but since an increase in volume results from the reaction of the metal powder with the oxygen evolved, the resultant shrinkage occurring is generally not large. Thus, for example, with a weight ratio $Ag_2O/Fe$ of 29/71, 45/55 and 80/20 the shrinkage is 0%, 0.8% and 10% respectively.

Since, as stated above, a high silver content in the boundary layer is desirable for satisfactory conductivity, optimum results are obtainable both from the mechanical and the electrical points of view with a mixture of about 45% by weight of silver oxide and 55% by weight of iron powder.

If the supply conductor is to be secured to a very smooth surface, it may be advantageous to use a small percentage of low-melting glass as a flux in the mixture.

In order to obtain a joint which is highly satisfactory from the mechanical point of view, the resistance body may be provided, at the point of connection of the supply conductor, with a cavity in which the supply conductor, the end of which is preferably flattened or otherwise deformed, is placed together with the mixture.

A resistance according to the invention has the advantage that in some cases, for example with a mixture of silver oxide and iron, the procedure need not be carried out in a reducing or neutral atmosphere, but the heating may be effected in air.

It is furthermore important that any high temperature should be localised so as to minimize the risk of variations in the resistance properties. As a rule this method ensures a joint between supply conductor and resistance body which satisfies high requirements both from a mechanical and an electrical point of view. This may be due to the fact that the intermediate layer of silver and metal oxide produced by reaction constitutes a satisfactory union between the metal of the supply conductor and the semi-conductive metal oxide material of the resistance body.

In order that the invention may be readily carried into effect, an example will now be described in detail with reference to the accompanying drawing which is a longitudinal section through a resistance.

A cylindrical resistance body 1, 4 mms. in diameter, made of a sintered homogeneous spinel phase of $Fe_3O_4$ and $Zn_2TiO_4$ in a ratio 1:1, is provided at the ends with bores 2 (2 mms. in depth, 1 mm. in diameter). Introduced into the bores are supply conductors 3, 0.5 mm. in thickness, slightly flattened at the ends 4, and a mixture of 45% by weight of silver oxide and 55% by weight of iron powder, which has been worked into a paste with water. In order to initiate the reaction in the mixture, it is heated for about 2 minutes at 600° C. The reaction gives a mixture of $Fe_3O_4$ and silver, which is liquid at the high temperature of the reaction. The intermediate layer 5 obtained constitutes a very strong joint between the supply conductor 3 and the resistance body 1 and has a very low contact resistance.

What I claim is:

1. A method of securing a supply conductor to a resistance body constituted by a sintered semi-conductive material, comprising the steps of applying a mixture of silver oxide and a metal exothermically reacting therewith upon heating to selected portions of the resistance body, embedding the supply conductor in the mixture applied to the body, and heating the mixture to initiate the reaction between the silver oxide and the metal.

2. A method as claimed in claim 1, in which the mixture contains a metal which during the reaction forms a semi-conductive oxide.

3. A method as claimed in claim 1, in which the mixture consists of approximately one half of silver oxide.

4. A method as claimed in claim 1, in which the mixture contains a metal which is capable of forming during the reaction the same semi-conductive oxide as that contained in the resistance body.

5. A method as claimed in claim 1, in which the resistance contains $Fe_3O_4$ and the supply conductors are secured with a mixture of silver oxide and iron powder.

6. A method as claimed in claim 5, in which the mixture which consists of 45% by weight of silver oxide and 55% by weight of iron powder.

7. A method as claimed in claim 1, in which the mixture contains a low-melting point glass.

8. A method as claimed in claim 1, in which the supply conductor is embedded in the mixture which is deposited in a cavity provided in the resistance body.

9. A method as claimed in claim 8, in which the supply conductor is deformed at the point of connection.

10. An electrical resistor comprising a body of semi-conductive material, and a terminal lead attached to said body by a joint comprising the heat reaction product of silver oxide and a metal exothermically reacting therewith upon heating.

11. An electrical resistor comprising a body of semi-conductive material, and a terminal lead attached to said body by a joint comprising the heat reaction product of silver oxide and a metal forming a semi-conductive oxide when heat reacted with the silver oxide.

12. An electrical resistor comprising a body of semi-conductive material containing $Fe_3O_4$ and a terminal lead attached to said body by a joint comprising the heat reaction product of silver oxide and iron.

ARIE BOL.

REFERENCES CITED

The following references are of record in the file of this patent:

UNITED STATES PATENTS

| Number | Name | Date |
| --- | --- | --- |
| 1,712,477 | Hediger | May 7, 1929 |
| 2,258,646 | Grisdale | Oct. 14, 1941 |
| 2,489,409 | Green et al. | Nov. 29, 1949 |

FOREIGN PATENTS

| Number | Country | Date |
| --- | --- | --- |
| 363,615 | Great Britain | Dec. 14, 1931 |
| 367,403 | Great Britain | Feb. 18, 1932 |